Patented Mar. 1, 1927.

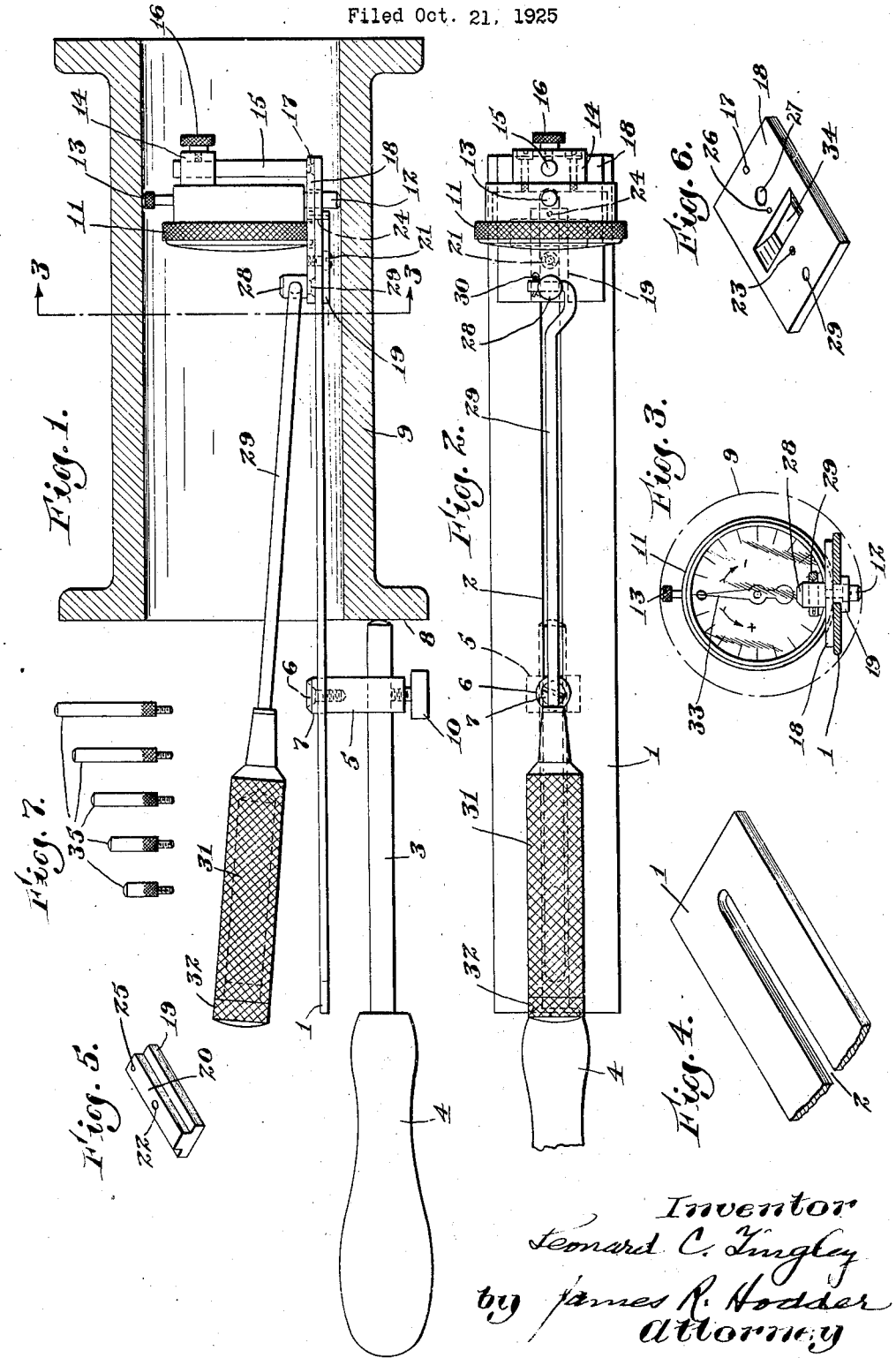

1,619,771

UNITED STATES PATENT OFFICE.

LEONARD C. TINGLEY, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND.

CYLINDER GAUGE.

Application filed October 21, 1925. Serial No. 64,001.

My present invention relates to an adjustable sliding cylinder gauge, and is particularly adapted to take inside measurements, diameters, tests and the like, in cylinders or the like, passageways where it is not feasible or convenient to use calipers.

An important object of the present invention is to provide a gauge which will be simple to operate, and yet efficient in service. To this end, I have devised the novel gauge shown in the drawing, wherein I utilize a base or body portion of the device as a guide or track for the gauge, instead of, as in former devices, utilizing the walls of the cylinder or the like passageway being measured, as a guide. So far as I am aware his is the first cylinder gauge utilizing a base on which the gauge may be slid or guided, for accurate measurements, and I wish to claim the same broadly herein.

A further feature of my present invention consists in the provision of a plurality of gauging points of any desired length, readily interchangeable in the gauging indicator, in order to facilitate the measuring or gauging of cylinders or passageways of varying diameters. These extra gauging points are contained in the hollow sliding rod handle, provided for this purpose.

Further features of the invention, novel combinations of parts, and advantages, will be herein more fully pointed out and claimed.

Referring to the drawings,

Fig. 1 illustrates my novel gauge positioned in a conventionally illustrated cylinder;

Fig. 2 is a top plan view of the gauging device;

Fig. 3 is a cross sectional view of the gauge on the line 3—3 of Fig. 1;

Fig. 4 is a sectional detail of one end of the base on which the gauge slides;

Fig. 5 is a detail of the sliding block;

Fig. 6 is a detail of the sliding plate on which the gauge portion rests; and

Fig. 7 illustrates a set of extra gauging points of varying lengths.

As shown in the drawings, my present device comprises a base 1, having therein a longitudinal slot 2; a depth gauging rod 3, having a handle 4, is connected to the base 1 by means of a support 5, this support 5 being adjustably secured to the base 1 by means of a clamping screw 6 operating through a clamping washer 7, to hold the support on the base 1, and being movable, upon releasing the clamping screw 6, along the slot 2 to any desired position, whereupon the clamping screw 6 is tightened and the support 5 firmly secured to the base 1. The depth gauging rod 3 fits through an aperture in the support 5, and when in proper position, such as abutting the face 8 of a conventional cylinder 9, the thumb or clamping screw 10 is tightened to hold the depth gauge rod in position. On the base 1 is slidably mounted a dial gauge 11, having thereon a lower gauging point 12 and an upper gauging point 13. The lower gauging point 12 is permanently secured in the gauge 11, but the upper engaging point 13 may be removed, and a longer or shorter gauging point affixed, as desired. Secured to the back of the dial gauge 11 is a guide support 14, fitted over a guiding post 15, and secured in position thereon by means of a knurled thumb or set screw 16. This guiding post 15 is attached at 17 to a plate 18, which plate slides on top of the base 1, and is provided with a transfer slot 34, in which the bottom of the dial gauge fits. I also provide a sliding T-block 19, the portion 20 of which fits into and slides in the slot 2 in the base 1. A clamping screw 21 passing through the aperture 22 in the T-block 19 and the aperture 23 in the plate 18, holds the plate 18 and block 19 in engagement. In addition thereto, and to effect a further clamping engagement of the T-block 19 and plate 18, I provide a dowel point 24, passing through apertures 25 in the T-block and 26 in the plate 18. The lower gauging point 12 freely passes through the hole 27 in the plate 18, to engage with one wall of a cylinder, or the like. On the fore end of the plate 18 is mounted a swivel sliding post 28, secured to the plate 18, as illustrated at 29. Attached to the sliding post 28 is one end of sliding rod 29, being held therein by a split pin 30, or any other desired means. On the outer end of the sliding rod 29 is a handle 31, having a screw cap 32. This screw cap is adapted to be removed, and the handle 31 is hollow for containing the upper gauging points of varying lengths.

Fig. 3 illustrates the dial indicator 11, having a pointer 33, which pointer is actuated by the movement of the upper gauging point 14 as illustrated, the gauge indicator is normally set at zero, movement of the upper gauging point 14 actuating the indicator 33 to indicate plus or minus in accordance with the variations in the walls of the cylinder 9 being measured.

In Fig. 7 I have illustrated a set of extra gauging points 35, all contained within the handle 31, and ready for instant interchanging with the gauging point 13.

The operation of my novel cylinder gauge will be readily understood, and is described as follows:

It being desired to measure or gauge the internal diameter of a cylinder, or the like, one of the gauging points commensurate with the diameter of the cylinder to be measured is fitted on the top of the gauge, such as 13 in the drawings. The base 1 is thereupon slid into the cylinder to the proper depth desired and the washer 7 securely clamped to the support 5 by the screw 6. Thereupon the rod 3 is adjusted in the support 5, until the end thereof contacts with the exterior of the cylinder to be measured, whereupon the clamping screw 10 is tightened and the device is then in position to be operated for gauging of the cylinder. The operator or mechanic holding the handle 4 in one hand, grasps the gauge operating handle in the other hand, and slides the gauge in and out of the cylinder, on the base 1. The normal or proper diameter of the cylinder will be indicated on the dial at zero. Upon movement of the dial gauge in the cylinder any inequalities in the diameter thereof will be apparent, plus or minus, on the dial. The operator thus has a constant visual indication of the entire diameter of the cylinder, and the entire gauge can be moved around the cylinder for gauging a different line of measurement, if desired.

It will thus be apparent that I have devised an extremely simple and efficient cylinder gauge, and one capable of operation in cylinders of greatly varying diameters. My novel device is simple to manufacture and to operate, and can be almost instantly adjusted to any size or diameter of cylinder, or the like, to be measured.

While I have necessarily described the invention somewhat in detail, it will be appreciated that I may vary the size, shape, and arrangement of parts, within reasonably wide limits, without departing from the spirit of the invention.

My invention is further described and defined in the form of claims as follows:—

1. A cylinder gauge of the kind described, comprising an elongated base adjustable to a fixed predetermined position within a cylinder, and an indicating gauge mounted on said base for reciprocation longitudinally thereof.

2. A cylinder gauge of the kind described, comprising an elongated base adjustable to a fixed predetermined position within a cylinder, an adjustable holding handle for said base, and an indicating gauge mounted on said base for reciprocation longitudinally thereof.

3. A cylinder gauge of the kind described, comprising a base adjustable to a fixed predetermined position within a cylinder, an elongated guideway in said base, and an indicating gauge mounted for reciprocation in said guideway.

4. A cylinder gauge of the kind described, comprising a base adjustable to a fixed predetermined position within a cylinder, an elongated guideway in said base, a plate adapted to slide in said guideway, and an indicating gauge mounted on said plate.

5. A cylinder gauge of the kind described, comprising a base adjustable to predetermined position within a cylinder, a guideway in said base, a plate adapted to slide in said guideway, a post on one end of said plate, an indicating gauge, and means for removably attaching said indicating gauge to said post.

6. A cylinder gauge of the kind described, comprising a base adjustable to predetermined position within a cylinder, a guideway in said base, a plate adapted to slide in said guideway, a post on one end of said plate, an indicating gauge, means for removably attaching said indicating gauge to said post, a boss on the opposite end of said plate, and a handle connected to said lug for sliding said plate, post and indicating gauge along the guideway in said base.

In testimony whereof, I have signed my name to this specification.

LEONARD C. TINGLEY.